UNITED STATES PATENT OFFICE.

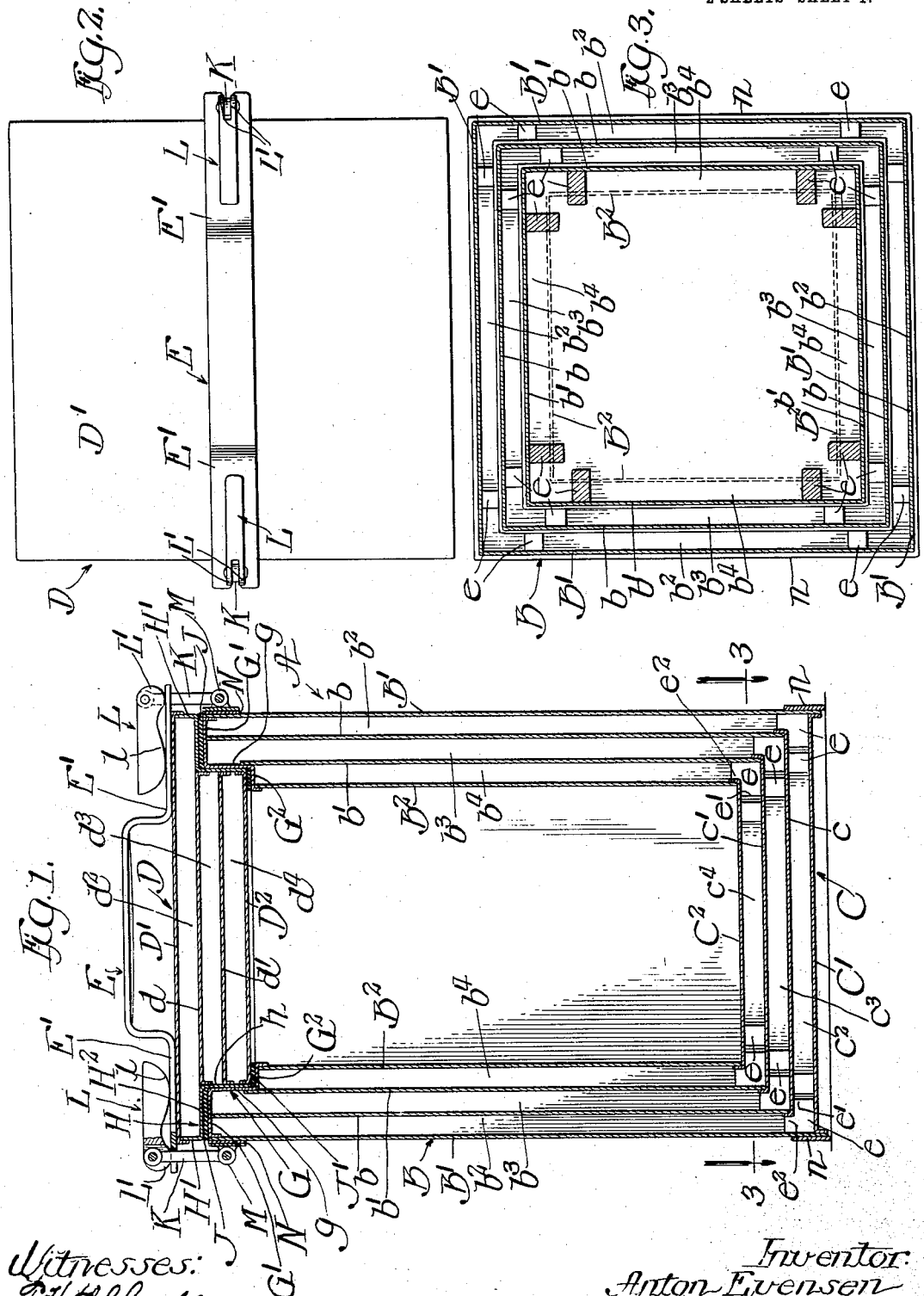

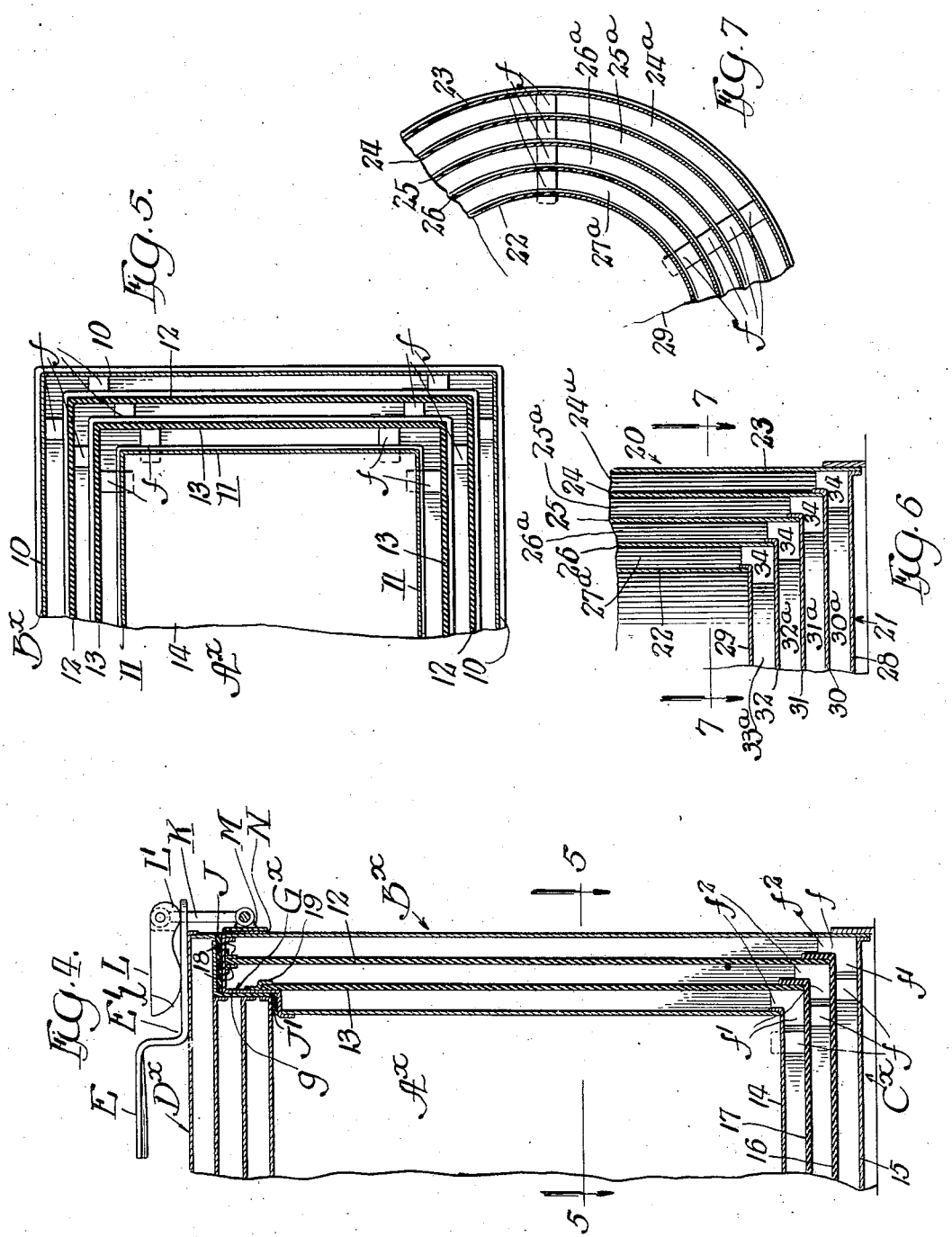

ANTON EVENSEN, OF CHICAGO, ILLINOIS.

NON-HEAT-CONDUCTING RECEPTACLE.

1,018,041.  Specification of Letters Patent.  Patented Feb. 20, 1912.

Application filed May 31, 1911. Serial No. 630,317.

*To all whom it may concern:*

Be it known that I, ANTON EVENSEN, a citizen of the United States, and a resident of Chicago, in the county of Cook and State of Illinois, have invented certain new and useful Improvements in Non-Heat-Conducting Receptacles; and I do hereby declare that the following is a full, clear, and exact description thereof, reference being had to the accompanying drawings; and to the letters of reference marked thereon, which form a part of this specification.

This invention relates to improvements in receptacles or vessels provided with non-heat conducting walls, and consists of the matters hereinafter described and more particularly pointed out in the appended claims.

In the drawings—Figure 1 is a view representing a vertical section through a receptacle or vessel having non-heat conducting walls made in accordance with my invention; Fig. 2 is a top plan view of the same; Fig. 3 is a view representing a cross section through the vessel in a plane indicated by the line 3—3 of Fig. 1; Fig. 4 is a view representing a vertical section through a modified form of my improved vessel; Fig. 5 is a view representing a cross section through the same on the line 5—5 of Fig. 4; Fig. 6 is a partial vertical section through a receptacle similar to that shown in Figs. 4 and 5, showing the construction when applied to a receptacle cylindrical in form; Fig. 7 is a view representing a cross section through Fig. 6 on the line 7—7 thereof.

Referring now to that embodiment of my invention, illustrated in Figs. 1 to 3, A indicates the vessel body which, as shown, is of rectangular tubular form and has upright side walls B and a bottom wall C. Said vessel is open at the upper end and is adapted to be closed by a closure or lid D. Each of the side walls B comprises an outer wall member B' and an inner wall member B² laterally spaced therefrom, and intermediate side wall members $b$, $b'$ which divide the space between said inner and outer side wall members into a plurality of jacket spaces, in this case three, $b^2$, $b^3$, $b^4$. The bottom wall member C also comprises an outer wall member C', and an inner wall member C² separated by a space which is divided by intermediate bottom wall members $c$, $c'$, into a corresponding number of jacket spaces, in this case three, $c^2$, $c^3$, $c^4$. The inner and outer side wall members of the four side walls of the vessel are each connected together at their vertical edges and are connected at their bottom edges with the inner and outer bottom wall members respectively. The intermediate side wall members $b$, $b'$, of the four side walls are connected together at their vertical edges, and all of the intermediate side wall members $b$, $b'$ of each side of the vessel are respectively connected by air-tight joints to the intermediate bottom wall members $c$, $c'$ in the order named. A plurality of jacket spaces, in this case three, are thus provided, each completely surrounding the sides and bottom of the vessel and arranged in succession one within the other. The wall members providing said jacket spaces are spaced apart and supported at the bottom of the vessel by a plurality of angle blocks or spacing pieces $e$ each having a horizontal flange $e'$ engaged between the bottom wall members and a vertical flange $e^2$ engaged between the side wall members. As shown in the drawings, said angle blocks or spacing pieces are arranged in sets of three, there being two sets for each side wall, each of which is located adjacent a corner of the vessel. The spacing pieces arranged as described not only hold the bottoms of the wall members accurately in proper relative position during the operation of securing together the parts at the top of the vessel, but in the use of the latter, serve to maintain the lower parts of said wall members from relative movement and thereby relieve the joints at the top of the vessel from strains and liability to rupture in rough handling, especially when the contents of the vessel is of considerable weight. The jacket spaces $b^2$, $b^3$, $b^4$, in the side wall members are closed at their upper ends by plates G, which are rigidly secured to the upper marginal edges of the side wall members by means affording air tight joints. Said plates also serve to hold said side wall members in proper spaced relation at their upper ends. As shown herein, the inner side wall member B² and the intermediate side wall member $b'$ are made of less depth than the other side wall members, and the plates G each have vertically spaced horizontal flanges G', G², the latter located within the former and connected to it by a vertical part $g$, which forms an upward extension of the intermediate side wall member $b'$. This construction provides a recess in the upper end walls of the vessel for the reception of a part of the closure or lid, said recess terminating in the shoulder constituted by the horizontal flange $G^2$, of the plate G.

The lid or closure D is, in construction, similar to that of the side and bottom walls of the vessel, and consists of an outer wall member $D'$ and an inner wall member $D^2$ spaced therefrom, and intermediate wall members $d$, $d'$, which divide said lid horizontally into three separate chambers or jacket-spaces $d^2$, $d^3$, $d^4$. As shown in the drawings, the inner wall member $D^2$ and the intermediate wall members $d'$ and $d$ are made of such dimensions as to fit within the recess at the upper end of the vessel, the side walls of which recess are provided by the parts $g$ of the plates G, while the outer wall member $D'$ of the lid is of such dimensions as to cover the entire surface of the upper end of the vessel. Plates H, each having a vertical part $H'$ inclosing the end of the space $d^2$, a vertical part $h$ spaced inward therefrom, adapted to fit closely against the vertical part $g$ of the plate G, and a horizontal flange $H^2$ adapted to engage against the horizontal flanges $G'$ of the plate G, are rigidly secured to the marginal edges of the inner and outer and the intermediate walls of the lid so as to hold them in proper spaced relation by means affording air tight joints. Rubber or other suitable gaskets J, $J'$ are preferably interposed between the horizontal engaging parts of the lid and of the upper end of the vessel so as to seal the vessel when the lid is in place.

Any suitable locking device for rigidly seating the lid member in position on the vessel may be used. As shown herein, the same consists of a handle bar E, which has ends $E'$, bearing against the top or outer wall member $D'$ of the lid and which projects at its ends beyond the side walls of the vessel. The ends of said handle bar are provided with notches into which are adapted to swing links K pivotally connected to the upper end of the body and carrying locking members L having cams $L'$ adapted when swung into horizontal position, as shown in Fig. 1, to engage the ends $E'$ of the handle bar and through said handle-bar cause the lid D to be forcibly seated against the upper end of the vessel.

As shown in the drawings, the locking members have curved ends $l$ under which the finger or fingers may be engaged to facilitate the release of the locking members. The links K are pivoted to lugs M rigidly secured to a rectangular band or loop N which embraces and reinforces the upper end of the vessel. The bottom of the vessel is also provided with a reinforcing hoop or band $n$, the lower margin of which preferably projects below the outer bottom wall member $C'$ to provide a base on which the vessel rests and by means of which the bottom wall C is supported above the surface on which the vessel rests thus leaving an air space between the two.

As heat is imparted to air by convection rather than by reason of its conductivity, the temperature of the outside air will take much longer to affect the temperature of the contents of my improved vessel than in the case of a vessel having a wall of like thickness but containing only one air chamber, since it is necessary for the air in each jacket to be heated or cooled by convection before it can impart the raised or lowered temperature to the wall dividing it from the next adjacent air jacket which in turn has the higher or lower temperature induced in it first by contact with the said wall and then by convection. The efficiency of the wall of the vessel as a non-conductor of heat is thus greatly increased by providing said wall with three or more jacket spaces.

The vessel illustrated in Figs. 1 to 3, and described above, is made of thin sheet metal, the sheet metal wall members being secured together at their joints by means of solder. In Figs. 4 and 5, I have shown a vessel in every way similar to that illustrated in Figs. 1 to 3, except that the side walls and bottom of the vessel have the intermediate wall members made of sheet fiber. Walls made of fiber are much poorer conductors than walls made of metal, so that the use of intermediate fiber walls increases to a greater degree the efficiency of the vessel walls as non-conductors of heat.

Referring now to the construction shown in Figs. 4 and 5, $A^\times$ indicates the vessel as a whole, $B^\times$, the side walls, $C^\times$, the bottom wall and $D^\times$, the lid. The latter, together with the locking devices which hold it rigidly seated within the upper end of the vessel, is of exactly the same construction as that above described. The side wall $B^\times$ comprises inner and outer walls 10 and 11 made of thin metallic plates, as in the case above described, and intermediate walls 12 and 13 made of fiber board. The bottom wall likewise comprises inner and outer wall members 14 and 15 and intermediate wall members of fiber board 16 and 17. The several wall members of the side wall are secured to the corresponding members of the bottom wall by means affording air tight joints, thus forming three jacket spaces inclosing the sides and bottom of the vessel. The side and bottom wall members are spaced apart and supported one within the other by angle blocks $f$ having flanges $f'$ extending between the bottom wall members and $f^2$ extending between the side wall members. Plates $G^\times$ inclose the spaces between the upper ends of the side wall members and hold said members in proper spaced relation. Said plate is constructed to provide a recessed seat for the lid, as in the case first described. As shown in the drawings, the upper end of the fiber wall 12 is secured to said plate G$^x$ by angle plates 18, 18, engaging the opposite marginal edges of the plate 12, and a Z-plate 19 engages one marginal edge of the upper end of the wall 13 and holds it against the vertical part $g$ of the plate G$^x$.

In Figs. 6 and 7, I have shown a construction of vessel in which the walls are made of metallic plates, as in the first case, but which is circular in form in cross section, and which is provided with four jacket spaces. In this case, 20 indicates the side wall of the vessel, and 21, the bottom wall of the vessel. The side wall of the vessel comprises inner and outer side wall members 22, 23, and three intermediate wall members 24, 25 and 26, dividing the space within the inner and outer side wall members into four jacket spaces 24$^a$, 25$^a$, 26$^a$, 27$^a$. The bottom wall member 21 likewise comprises inner and outer wall members 28 and 29, and three intermediate wall members 30, 31 and 32, dividing said space between said inner and outer bottom wall members into four air spaces 30$^a$, 31$^a$, 32$^a$, 33$^a$. The side wall members and the bottom wall members are connected together as before and provide four jacket spaces inclosing the vessel, said wall members being spaced apart by angle blocks 34.

A vessel or receptacle having walls constructed in accordance with my invention herein described, is light and portable and at the same time is strong and durable and will stand much rough handling without injury. While its walls are made of conducting material, the use of the three or more jacket spaces inclosing the vessel, as described, provides the requisite heat insulation, so that its contents will retain for a long time unchanged the temperature which it has when placed within the vessel.

My improved vessel is an economical and efficient substitute for the so-called thermos bottles now in use and its size is not limited as in the case of such bottles by the difficulties and rapidly increasing expense in manufacturing large sizes, as manifestly it is possible to make a vessel in accordance with my invention of practically any portable size without unduly increasing its cost. Furthermore, my vessel may be made of any form adapted for the use to which it is to be put.

I claim as my invention—

1. A non-heat conducting vessel having side walls and a bottom wall each comprising inner and outer wall members of sheet material spaced from each other, and one or more intermediate wall members of sheet material dividing the space between said inner and outer wall members into two or more air spaces, said side wall members and bottom wall members being connected together to provide two or more non-communicating jacket spaces one within the other inclosing the sides and bottom of said vessel, spacing pieces interposed between said side and bottom wall members at the junction of the latter, and means for closing the upper ends of the spaces between said side wall members adapted to provide a seat for a lid or closure for said vessel.

2. A non-heat conducting vessel having side walls and a bottom wall, each comprising inner and outer wall members of sheet metal spaced from each other, and a plurality of intermediate wall members of sheet fiber dividing the space between said inner and outer wall members into two or more air spaces, said side wall members and bottom wall members being connected together to provide three or more non-communicating jacket spaces one within the other inclosing the sides and bottom of said vessel, spacing pieces interposed between said side and bottom wall members at the junction of the latter, and means for closing the upper ends of the spaces between said side wall members and adapted to provide a seat for a lid or closure for said vessel and provided with flanges forming grooves to receive the upper edges of the intermediate side wall members.

In testimony, that I claim the foregoing as my invention I affix my signature in the presence of two witnesses, this 24th day of May A. D. 1911.

ANTON EVENSEN.

Witnesses:
  G. R. WILKINS,
  T. H. ALFREDS.